United States Patent [19]
Holdridge et al.

[11] Patent Number: 4,932,755
[45] Date of Patent: Jun. 12, 1990

[54] OPTICAL TRANSPARENCY HAVING AN ELECTROMAGNETIC PULSE SHIELD

[75] Inventors: David W. Holdridge, Fullerton, Calif.; Duane S. Dewald, Fort Wayne, Ind.

[73] Assignee: Swedlow, Inc., Garden Grove, Calif.

[21] Appl. No.: 257,458

[22] Filed: Oct. 12, 1988

[51] Int. Cl.$^5$ .................... G02B 27/00; H05K 4/00
[52] U.S. Cl. ................... 350/321; 174/35 MS
[58] Field of Search ............. 350/276 R, 276 SL, 321, 350/322, 164; 358/253, 252; 174/35 MS, 36; 324/156

[56] References Cited

U.S. PATENT DOCUMENTS

| | | | |
|---|---|---|---|
| 3,265,804 | 8/1966 | Berger et al. | 174/35 MS |
| 3,389,951 | 6/1968 | Eagles et al. | 350/321 |
| 4,323,946 | 4/1982 | Traux . | |
| 4,412,255 | 10/1983 | Kuhlman et al. | 174/35 MS |
| 4,435,465 | 3/1984 | Ebneth et al. | 174/35 MS |
| 4,631,214 | 12/1986 | Hasegawa | 428/68 |
| 4,684,762 | 8/1987 | Gladfelter | 174/35 MS |
| 4,731,500 | 3/1988 | Otsuka | 174/35 MS |

OTHER PUBLICATIONS

Postupack, Dennis S. and Pressau, Jean P., "Electroforming EMP Grid for Aircraft Transparencies," 1987.

Primary Examiner—Bruce Y. Arnold
Assistant Examiner—Loha Ben
Attorney, Agent, or Firm—Pretty, Schroeder, Brueggemann & Clark

[57] ABSTRACT

An optical transparency adapted to substantially attenuate electromagnetic pulses incident on it, yet transmit visible light with minimal distraction being caused by Fraunhofer diffraction. The transparency includes a transparent sheet and a laminated, electrically-conductive grid that defines a densely-packed array of apertures. Each aperture is a modified polygon having multiple curved sides, such that visible light from a remote point source of light is diffracted by the curved sides of each aperture over multiple, diverging, fan-like areas and minimal distraction to a person viewing through the transparency is thereby provided.

16 Claims, 3 Drawing Sheets

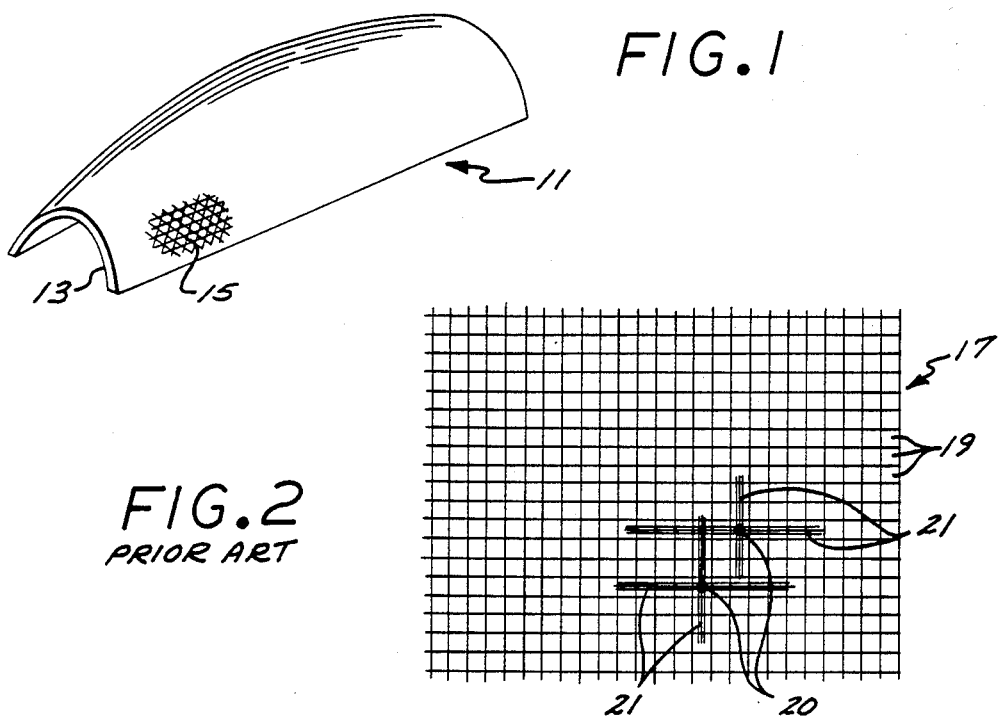
FIG. 1
FIG. 2 PRIOR ART
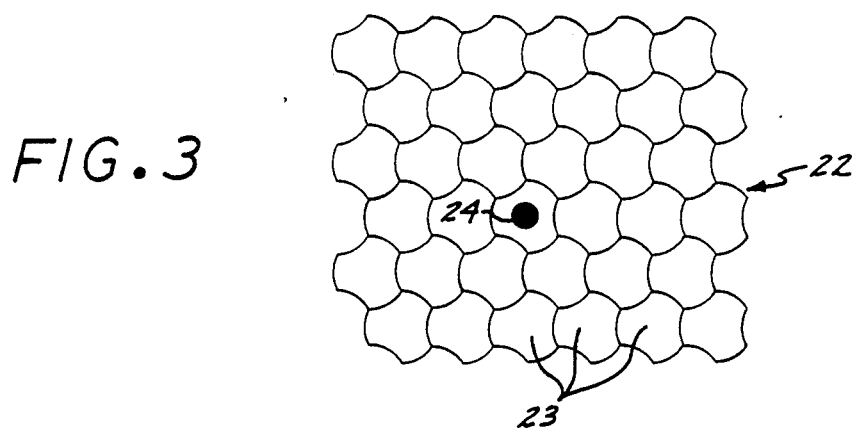
FIG. 3

OPTICAL TRANSPARENCY HAVING AN ELECTROMAGNETIC PULSE SHIELD

BACKGROUND OF THE INVENTION

This invention relates generally to optical transparencies, and, more particularly, to optical transparencies having a laminated, electrically-conductive layer for shielding against electromagnetic interference (EMI) and electromagnetic pulses (EMP).

Many aircraft now being built and flown must be capable of protecting their sensitive electronic equipment from the harmful effects of EMI and EMP. EMP, which are created by lightning and nuclear explosions, can have an intensity as high as 50 kilovolts per meter, in a frequency range of about 10 kilohertz to 100 megahertz. For intensities this high, substantial shielding is essential.

In the past, optical transparencies of such aircraft have protected against EMI and EMP by including laminated, electrically-conductive screens, frequently carried on the inwardly-facing surface of a plastic (e.g., polymethyl methacrylate) sheet. The screens typically have taken the form of a simple X-Y grid of electrical conductors that define an array of small, square apertures. The laminated screens are highly effective in substantially attenuating EMI and EMP, yet they transmit a very high percentage (e.g. 95%) of visible light, with little distortion.

Although the optical transparencies of the kind described above have proven to be highly effective in attenuating EMI and EMP, with good transmission of visible light, the transparencies can sometimes provide objectionable distortion to the visible light, particularly point sources of light and particularly at night. Fraunhofer diffraction can cause a point source of light to appear to have a generally cross shape, with orthogonal streaks emanating from the location of the actual point source. The streaks are aligned with the two axes of the grid shield and can be highly distracting to a person viewing through the transparency, particularly when multiple point sources of light (e.g. landing strip lights) are being viewed.

Diffraction-induced distractions of the kind described above can be eliminated by using a grid that defines a compact array of circular holes, like the grids in the doors of many microwave ovens. However, such grids are considered to transmit too low a proportion of incident visible light for many applications, particularly aircraft applications.

It should, therefore, be appreciated that there is a need for an improved optical transparency that shields against EMI and EMP, yet that transmits a high proportion of incident visible light and that provides reduced distraction caused by Fraunhofer diffraction. The present invention fulfills this need.

SUMMARY OF THE INVENTION

The present invention is embodied in an optical transparency that is adapted to substantially attenuate an impinging electromagnetic pulse (EMP), yet transmit visible light with negligible distraction caused by Fraunhofer diffraction. The transparency includes a transparent sheet and a laminated, electrically-conductive grid that defines a densely-packed array of apertures. In accordance with the invention, each of the densely-packed apertures is a modified polygon having multiple curved sides, and the electrical conductors forming the grid all have a substantially uniform width. The grid substantially attenuates any EMP impinging on the transparency, yet transmits a substantial proportion of incident visible light, with negligible distraction being caused by Fraunhofer diffraction. The reduced distraction is due to the spreading out of the light diffracted from each aperture by the aperture's curved sides.

In more detailed features of the invention, the modified polygonal shape of each aperture takes the form of any nestable geometric shape such as a triangle, square, rectangle or hexagon. Combinations of such geometric shapes, as are commonly provided in geodesic domes, can also be used.

All of the grid's electrical conductors must be curved, to achieve minimum distraction due to Fraunhofer diffraction. However, the degree of curvature is selectable and can be either convex or concave or both. In addition, the curvature of each side of each aperture can be independently selected; however, minimum distraction is believed to be provided if all of the unit cells have apertures of substantially the same shape and area.

Other features and advantages of the present invention should become apparent from the following description of the preferred embodiments, taken in conjunction with the accompanying drawings, which illustrate, by way of example, the principles of the invention.

BRIEF DESCRIPTION OF THE DRAWINGS

FIG. 1 is a perspective view of a portion of an airplane canopy embodying the present invention, which includes an electrically-conductive EMP screen.

FIG. 2 is a plan view of a conventional square-grid EMP screen prior to its being laminated with a transparent sheet and formed into a desired contour.

FIG. 3 is a plan view, similar to FIG. 2, but of a first embodiment of an EMP screen in accordance with the invention, this embodiment defining a densely-packed array of six-sided apertures.

DESCRIPTION OF THE PREFERRED EMBODIMENTS

Figure 4:
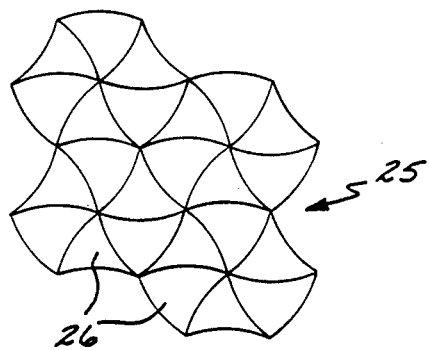
FIG. 4 is a plan view similar to FIG. 3 but of a second embodiment of an EMP screen in accordance with the invention, this embodiment defining a densely-packed array of three-sided apertures.

With reference now to the drawings, and particularly to FIG. 1, there is shown an aircraft canopy 11 that includes a transparent plastic (e.g. polymethyl methacrylane) sheet 13 and a laminated, electrically-conductive screen 15. The screen functions to attenuate any impinging electromagnetic interference (EMI) or electromagnetic pulse (EMP), thereby protecting personnel and sensitive electronic equipment carried within the aircraft. As is conventional, the screen is laminated to the transparent plastic sheet (e.g. to its inside surface), and the laminated transparency is formed to any desired contour. The screen takes the form of a metallic grid that defines an array of small apertures, typically about 0.100 inch across, which transmits a high percentage of visible light, with minimal distortion.

In the past, EMP screens of this kind have typically taken the form of a square, X-Y grid 17, as shown in FIG. 2. The grid defines an array of substantially square apertures 19, which transmit about 95 percent of visible light incident on it. Although the grid 17 is highly effective in blocking EMP, it is believed to cause undue distractions because of Fraunhofer diffraction. This is a particular problem at night, when viewing multiple point sources of light 20, such as an array of landing strip lights. Fraunhofer diffraction causes each point source of light to appear to have streaks of light 21 emanating from it, along the axes of the grid. This provides an effect that has been characterized as a "star burst."

The objectionable distraction due to Fraunhofer diffraction by the X-Y grid 17 of FIG. 2 occurs because the electrical conductors that form the grid are all substantially straight. Since light passing through each aperture is diffracted only along axes perpendicular to the aperture boundaries, which are straight, the diffracted light is constrained to the two orthogonal axes. The width of each apparent streak of light 21 corresponds to the length of the conductor segment defining the side of the square aperture 19.

In accordance with the invention, the objectionable distractions caused by the Fraunhofer diffraction of light transmitted through the screen 15 is minimized by configuring the screen apertures to have curved sides. This spreads the diffracted light over multiple, fan-like areas and thus sharply reduces the diffracted light's localized intensity. Significantly less distraction is thereby provided, while maintaining equivalent levels of EMP attenuation and visible light transmission.

One configuration for an EMP screen 22 in accordance with the invention is depicted in FIG. 3. The screen grid defines a densely-packed, nested array of generally hexagonal apertures 23, with the six sides of each aperture all having a slight degree of curvature. This spreads the diffracted light from each aperture over six generally fan-like areas. The localized intensity of light at each point in these six areas is relatively low and thus is not readily perceived by a person viewing through the grid. A point source of light 24, therefore, will be observed merely as a point source, without streaks emanating from it.

It will be observed that each aperture 23 in the grid 22 of FIG. 3 has three convex sides alternating with three concave sides. This arrangement provides all of the nested apertures with identical areas. It will be appreciated, however, that alternative configurations, with different arrangements of convex and concave sides could also be used. In some of those cases, however, the apertures would not all have the same effective area.

FIG. 4 depicts a screen 25 having a grid pattern that defines an array of generally triangular-shaped apertures 26, with each aperture again being defined by sides that are slightly curved. Like the screen embodiment of FIG. 3, light diffracted through each triangular-shaped aperture is distributed over three generally fan-like areas. This reduces the localized intensity of the diffracted light such that its perception by a person viewing through the screen is negligible.

It will be noted that half of the generally triangular-shaped apertures 26 in the screen 25 of FIG. 4 have two convex sides and one concave side, and the other half have one convex side and two concave sides. Consequently, the areas of the two sets of apertures are slightly different from each other. Nevertheless, this has a negligible effect on the distortion-free visibility of objects viewed through the grid 25.

Figure 5:
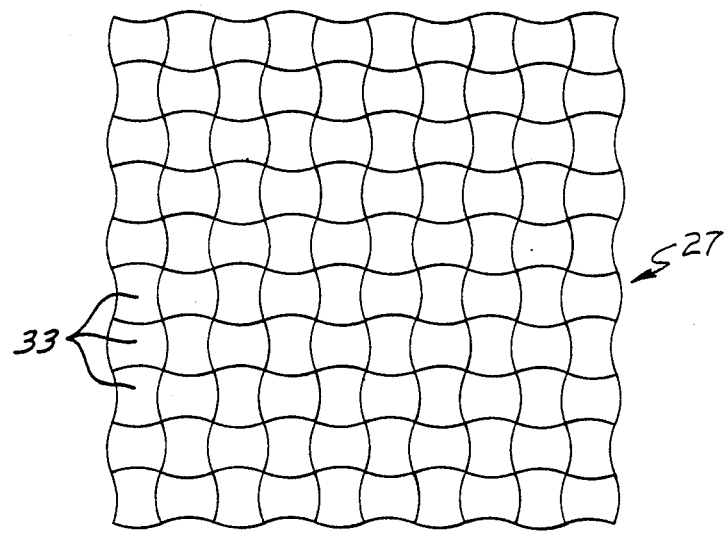
FIGS. 5–7 are all oversized plan views, similar to FIGS. 3 and 4, but of three additional embodiments of EMP screens in accordance with the invention, each of these embodiments defining a densely-packed array of four-sided apertures.
Figure 6:
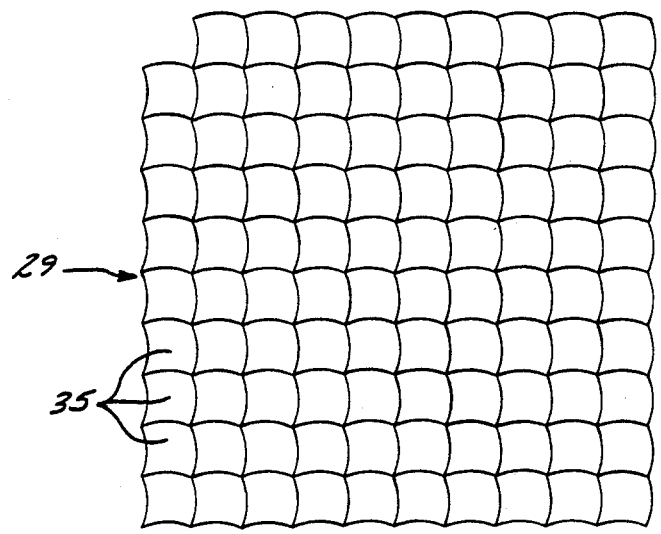
Figure 7:
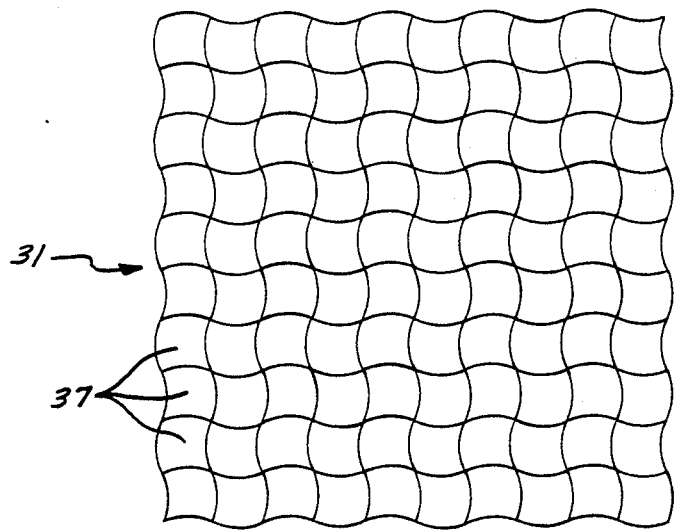

FIGS. 5-7 all depict grid configurations that define four-sided apertures. The grids are identified by the reference numerals 27, 29 and 31, respectively. The apertures 33, 35 and 37 of the respective grids have substantially the same area and are defined by two convex an concave sides. The apertures differ from one another only in the arrangement of their convex and concave sides.

In the grid 27 depicted in FIG. 5, the two concave sides of each aperture 33 are located across from each other such that each aperture has a generally hourglass shape. In both FIG. 6 and FIG. 7, the two concave sides of each aperture are located immediately adjacent to each other, with the difference between the two grids arising from a different arrangement of the apertures with respect to each other. The FIG. 6 apertures 35 appear somewhat like fish scales, whereas the FIG. 7 apertures 37 combine to create a wave-like appearance that results from the elimination of instantaneous direction changes in the grid conductors.

All of the depicted grid embodiments can be formed using any of a number of conventional processes. For example, the grid can be formed by a vapor depositing a thin copper film on one surface of the transparent sheet 13 (FIG. 1) and by then photo-etching the desired grid pattern.

As is conventional, the apertures defined by the various grid embodiments are all preferably the same approximate size, e.g., about 0.100 inch across. This provides minimal distraction to a person viewing remote objects through the transparency. Also as is conventional, the conductors making up the grid preferably have a uniform width of about 0.003 inch. Consequently, all of the grid embodiments depicted will transmit at least about 95 percent of all visible light incident on them.

It should be appreciated from the foregoing description that the present invention provides an improved optical transparency adapted to substantially attenuate electromagnetic pulses incident on it, yet transmit a substantial proportion of incident visible light, with minimal distraction being cause by Fraunhofer diffraction. The transparency includes a transparent sheet and a laminated, electrically-conductive grid that defines a densely-packed array of apertures. Each aperture is a modified polygon having multiple curved sides, such that visible light from a remote point source of light is diffracted over a series of diverging, fan-like areas and minimal distraction is thereby provided.

Although the invention has been described in detail with reference only to the preferred embodiments, those of ordinary skill in the art will appreciate that various modifications can be made without departing from the invention. Accordingly, the invention is defined only by the following claims.

We claim:

1. An optical transparency adapted to attenuate an impinging electromagnetic pulse, yet transmit visible light with negligible distraction being caused by Fraunhofer diffraction, the optical transparency comprising:
   a transparent sheet; and
   an electrically-conductive grid laminated with the transparent sheet and including electrical conductors of substantially uniform width that define a densely-packed array of apertures, each aperture being a modified polygon having multiple curved sides;

wherein the electrically-conductive grid substantially attenuates any electromagnetic pulse impinging on the transparency, yet transmits a substantial proportion of incident visible light, with negligible distraction being caused by Fraunhofer diffraction.

2. An optical transparency as defined in claim 1, wherein the apertures defined by the electrically-conductive grid all have three sides.

3. An optical transparency as defined in claim 1, wherein the apertures defined by the electrically-conductive grid all have four sides.

4. An optical transparency as defined in claim 1, wherein the apertures defined by the electrically-conductive grid all have six sides and are substantially identical in shape and area.

5. An optical transparency as defined in claim 4, wherein the apertures defined by the electrically-conductive grid all have sides that are alternatively convex and concave.

6. An optical transparency as defined in claim 1, wherein the apertures defined by the electrically-conductive grid all have substantially the same shape and area.

7. An optical transparency as defined in claim 1, wherein the apertures defined by the electrically-conductive grid all have multiple curved sides, including just a single arc.

8. An optical transparency as defined in claim 1, wherein the electrically-conductive grid is sized to transmit through its apertures at least about 95 percent of visible light incident on the grid.

9. For use in laminated aircraft transparency, an electromagnetic pulse shield that transmits visible light with negligible distraction being caused by Fraunhofer diffraction, the electromagnetic pulse shield comprising:

an electrically-conductive grid including electrical conductors of substantially uniform width that define a densely-packed array of apertures, each aperture being a polygon modified to have multiple curved sides;

wherein the electrically-conductive grid substantially attenuates any electromagnetic pulse impinging on the transparency, yet transmits a substantial proportion of incident visible light, with negligible distraction being caused by Fraunhofer diffraction.

10. An electromagnetic pulse shield as defined in claim 9, wherein the apertures defined by the electrically-conductive grid all have three sides.

11. An electromagnetic pulse shield as defined in claim 9, wherein the apertures defined by the electrically-conductive grid all have four sides.

12. An electromagnetic pulse shield as defined in claim 9, wherein the apertures defined by the electrically-conductive grid all have six sides and are substantially identical in shape and area.

13. An electromagnetic pulse shield as defined in claim 12, wherein the apertures defined by the electrically-conductive grid all have sides that are alternatively convex and concave.

14. An electromagnetic pulse shield as defined in claim 9, wherein the apertures defined by the electrically-conductive grid all have substantially the same shape and area.

15. An electromagnetic pulse shield as defined in claim 9, wherein the apertures defined by the electrically-conductive grid all have multiple curved sides, each including just a single arc.

16. An electromagnetic pulse shield as defined in claim 9, wherein the electrically-conductive grid is sized to transmit through its apertures at least about 95 percent of visible light incident on the grid.

* * * * *